United States Patent
Zhang et al.

(10) Patent No.: US 7,646,293 B2
(45) Date of Patent: Jan. 12, 2010

(54) SYSTEM AND METHOD FOR TESTING A BUZZER ASSOCIATED WITH A COMPUTER

(75) Inventors: Zhao-Bin Zhang, Guangdong (CN); De-Hua Dang, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 366 days.

(21) Appl. No.: 11/308,990

(22) Filed: Jun. 5, 2006

(65) Prior Publication Data

US 2007/0100572 A1    May 3, 2007

(30) Foreign Application Priority Data

Nov. 2, 2005    (CN) .................. 2005 1 0100957

(51) Int. Cl.
  G08B 29/00    (2006.01)
(52) U.S. Cl. .................. 340/514; 340/384.5; 704/254
(58) Field of Classification Search .................. 340/514, 340/384.4, 384.5; 704/251, 254, 255; 395/2.63, 395/2.91, 2.92; 73/585, 5.85
See application file for complete search history.

(56) References Cited

U.S. PATENT DOCUMENTS

| | | | |
|---|---|---|---|
| 4,107,465 A * | 8/1978 | Charlebois et al. ............ 73/585 |
| 5,640,490 A * | 6/1997 | Hansen et al. ............ 704/254 |
| 5,873,062 A * | 2/1999 | Hansen et al. ............ 704/254 |
| 6,956,387 B2 | 10/2005 | Ho | |

FOREIGN PATENT DOCUMENTS

| | | |
|---|---|---|
| CN | 2170561 Y | 6/1994 |
| JP | 53-128327 | 11/1978 |
| JP | 2000214052 A * | 8/2000 |
| JP | 2005-221408 | 8/2005 |
| TW | 200516957 | 5/2005 |
| TW | I241830 | 10/2005 |

OTHER PUBLICATIONS

Gui-Yan Zhao, Design of Audio Signal Analyzer Based on Virtual Instrument Technology, Control Engineering of China, Jul. 31, 2004, pp. 179-181, vol. 11. S1, Zhanjiang Ocean University, Guangdong, China.

* cited by examiner

*Primary Examiner*—Van T. Trieu
(74) *Attorney, Agent, or Firm*—Winston Hsu

(57) ABSTRACT

An exemplary system for testing a buzzer (110) associated with a computer (100) includes a buzzing module (122) for controlling the buzzer to sound continuously according to a reference frequency value and a reference amplitude value; a recording module (124) for storing the buzzer sound recorded by an audio receiving device as a recorded audio data file into the computer; an analyzing module (126) for analyzing the recorded audio data file to obtain a real frequency value and a real amplitude value of the buzzer sound; and a determining module (128) for comparing the real frequency value and the real amplitude value with their reference values to determine whether the buzzer is in good working condition. A related method is also provided.

9 Claims, 3 Drawing Sheets

SYSTEM AND METHOD FOR TESTING A BUZZER ASSOCIATED WITH A COMPUTER

FIELD OF THE INVENTION

The present invention is generally related to systems and methods of computer tests, and more particularly, to a system and method for computer hardware devices tests.

DESCRIPTION OF RELATED ART

A buzzer or a beeper is a signalling device, usually electronic, and widely used in common life, such as in automobiles, household appliances, game shows, and so on for sounding a warning in the format of a continuous, an intermittent buzzing, or a beeping sound. Buzzers are also commonly used in computers to inform computer users of warnings of computer system emergencies. Apparently, buzzers have become more and more essential in computers.

A computer, during assembly, may be installed with a plurality of peripheral devices in including the buzzer while it is in the assembly plant. Before the computer is shipped to a customer or a computer retailer, the computer should pass a series of tests to make sure that the computer as well as its peripheral devices works normally.

One of these tests is a buzzer test. The purpose of the buzzer test is to test functions of the buzzers installed in a computer. Typically, the buzzer test is done by controlling the buzzer to sound a continuous buzzing sound while a test engineer listens to the buzzer with ears to determine if the buzzer is in working condition.

However, the above mentioned test practice has many disadvantages. For example, each computer needs to be assigned one test engineer to monitor the test, increasing the production cost of the computer assembly factory for each engineer hired. Furthermore, the determining factor of the buzzer test result lies significantly on the test engineer's ears. The combination of the test engineer's hearing condition, surrounding sound pollution, creates an inconsistent test environment.

What is needed, therefore, is a method for testing a buzzer associated with a computer automatically.

SUMMARY OF THE INVENTION

One preferred embodiment provides a system for testing a buzzer associated with a computer. The system includes a buzzing module, a recording module, an analyzing module and a determining module. The buzzing module is configured for controlling the buzzer to sound continuously according to a reference frequency value and a reference amplitude value. The recording module is configured for storing the buzzer sound recorded by an audio receiving device as a recorded audio data file into the computer. The analyzing module is configured for analyzing the recorded audio data file to obtain a real frequency value and a real amplitude value of the buzzer sound. The determining module is configured for comparing the real frequency value and the real amplitude value with their respective reference values to determine whether the buzzer is in good working condition.

Another preferred embodiment provides a method for testing a buzzer. The method includes the steps of: controlling the buzzer to sound continuously according to a reference frequency value and a reference amplitude value; recording the buzzer sound; storing the buzzer sound as a recorded audio data file; analyzing the recorded audio data file to obtain a real frequency value and a real amplitude value of the buzzer sound; and comparing the real frequency value and the real amplitude value with their respective reference values to determine whether the buzzer is in good working condition.

Other systems, methods, features, and advantages will be or become apparent to one skilled in the art upon examination of the following drawings and detailed description.

DETAILED DESCRIPTION OF THE INVENTION

Figure 1:
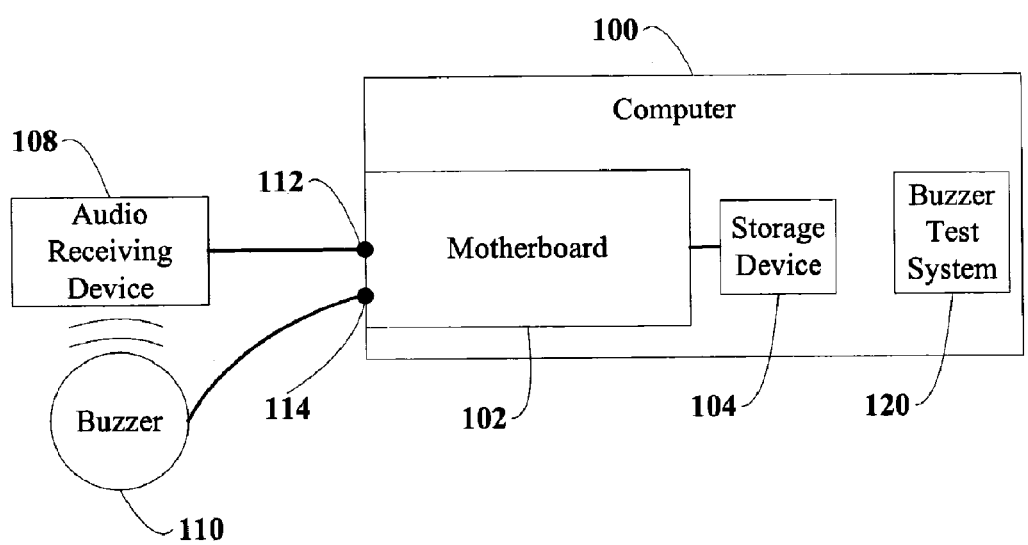
FIG. 1 is a schematic diagram of an application environment of a system for testing a buzzer in accordance with one preferred embodiment.

FIG. 1 is a schematic diagram of an application environment of a system for testing a buzzer in accordance with one preferred embodiment. The application environment may typically include a computer 100, a buzzer 110, and an audio receiving device 108, such as a microphone or a recording pen. The computer 100 may be an IBM clone personal computer (PC). Typically, the computer 100 may include a motherboard 102, a storage device 104, a central processing unit (CPU), a memory and other units or hardware, such as an audio card, a graphic accelerating card, a keyboard, a mouse, and so on. However, in order to describe the preferred embodiment concisely, these units are not shown in the drawings.

The motherboard 102 may be a typical main board that can be configured in a computer. The motherboard 102 typically provides a plurality of interfaces or ports for attachment of various peripheral devices or hardware, for example, providing a CPU socket for the attachment of a CPU and providing a memory slot for the attachment of a memory. In the preferred embodiment, the motherboard 102 further provides a storage interface for the attachment of the storage device 104, a buzzer port 114 for the attachment of the buzzer 110, and a corresponding interface 112 for the attachment of the audio receiving device 108.

The storage device 104 may be an internal storage of the computer 100, such as a hard disk or a floppy disk, or even an external storage device, such as a compact disk, a flash memory or the like.

In the embodiment, the audio receiving device 108 is close enough to the buzzer 110 such that the audio receiving device 108 can receive continuous buzzing sounds generated by the buzzer 110. That is, the motherboard 102, the buzzer 110, and the audio receiving device 108 collectively form a transmission loop such that continuous buzzing sounds generated by the buzzer 110 can be gathered and received by the audio receiving device 108 and finally transmitted into the computer 100.

Moreover, a buzzer test system 120 is installed on the computer 100 to assist the computer 100 to test whether the buzzer 110 is in good working condition. The buzzer test system 120 is typically an application software or a combination thereof executable by a typical computer.

Figure 2:
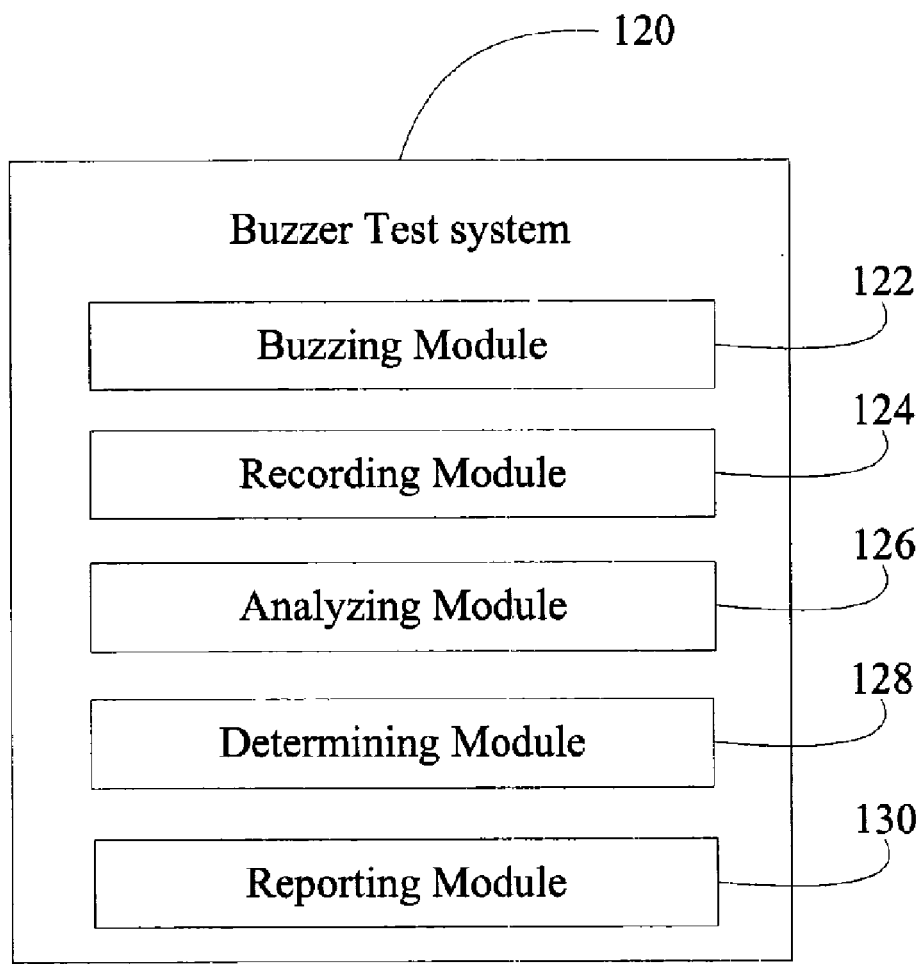
FIG. 2 is a schematic diagram of function modules of the buzzer test system of FIG. 1.

FIG. 2 is a schematic diagram of function modules of the buzzer test system 120. The buzzer test system 120 mainly includes a buzzing module 122, a recording module 124, an analyzing module 126, a determining module 128, and a reporting module 130.

The buzzing module 120 is mainly configured for controlling the buzzer 110 to sound continuously according to a reference frequency value and a reference amplitude value. The reference values are specified in the specification of the buzzer 110 provided by its manufacturer. The buzzer 110 generates continuous sounds with the reference values when in good working condition.

The recording module 122 is mainly configured for controlling the audio receiving device 108 to receive and record the buzzer sound, and to store the buzzer sound as a recorded audio data file in the storage device 104. The audio receiving device 108 is kept close enough to the buzzer 110 for a certain period when the buzzer 110 sounds in order to receive and to record the buzzer sound. A certain period is set long enough for the recording module 12 to receive and to record a continuous and steady segment of the buzzer sound. After recording, the recording module 124 stores the recorded continuous and steady segment of the buzzer sound as the recorded audio data file in the storage device 104. The recorded audio data file is typically in the format of a wave file, and alternatively in the format of an MPEG-1 Audio Layer3 (MP3) format, or other audio file formats.

The analyzing module 126 is mainly configured for analyzing the recorded audio data file to obtain a real frequency value and a real amplitude value of the buzzer sound. The analysis is achieved by using a Fast Fourier Transform (FFT) Algorithm. After analyzing the recorded audio data file by using the FFT Algorithm, the analyzing module 126 outputs the real values of the buzzer sound.

The determining module 128 is mainly configured for comparing the real frequency value and the real amplitude value with their respective reference values to check whether the real values agrees with the reference values, so as to determine a test result of whether the buzzer 110 in good working condition. Specifically, the test result denotes that the buzzer functions in good working condition if the real values agrees with their respective reference values; or the buzzer is not in good working condition if the real values do not agree with their respective reference values.

The reporting module 130 is mainly configured for reporting the test result. The test result may be shown on a monitor or printed by a printer, or in other suitable manners.

Figure 3:
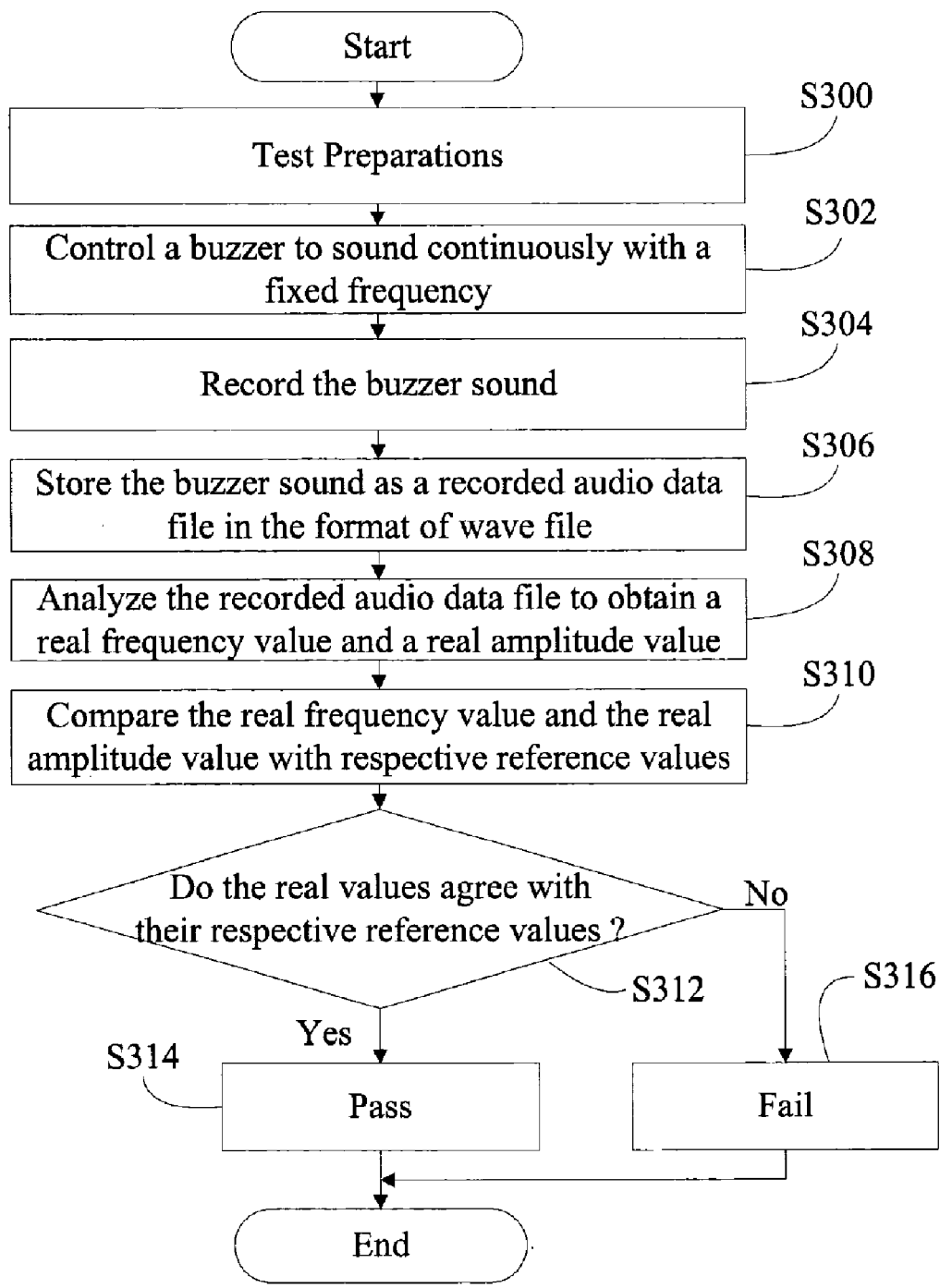
FIG. 3 is a flowchart of a method for testing a buzzer in accordance with one preferred embodiment.

FIG. 3 is a flowchart of a method for testing the buzzer in accordance with one preferred embodiment. Step S300 includes test preparations that include: connecting the audio receiving device 108 to the motherboard 102 via the corresponding interface 112; connecting the buzzer 110 to the motherboard 102 via the buzzer port 114; approaching the audio receiving device 108 to the buzzer 110 so as to form a transmission loop; and executing the buzzer test system 120 in the computer 100.

In step S302, the buzzing module 122 controls the buzzer 110 to sound continuously according to the reference frequency value and the reference amplitude value. The reference values are specified in the specification of the buzzer 110 provided by its manufacturer.

In step S304, the recording module 124 receives and records the buzzer sound by the buzzer 110. During the test, the audio receiving device 108 is kept close enough to the buzzer 110 for a certain period when the buzzer 110 sounds. The certain period is set long enough for the recording module 12 to receive and record a continuous and steady segment of the buzzer sound.

In step S306, the recording module 124 stores the recorded continuous and steady segment of the buzzer sound as the recorded audio data file in the storage device 104. The recorded audio data file is typically in the format of the wave file, and alternatively in the format of the MPEG-1 Audio Layer3 (MP3) format, or other audio file formats.

In step S308, the analyzing module 126 analyzes the recorded audio data file to obtain the real frequency value and the real amplitude value of the buzzer sound. The analysis is achieved by using a Fast Fourier Transform (FFT) Algorithm. After analyzing the recorded audio data file by using FFT Algorithm, the analyzing module 126 outputs the real values of the buzzer sound.

In step S310, the determining module 128 compares the real frequency value and the real amplitude value with their respective reference values. In Step S312, the determining module 128 checks whether the real values agree with their respective reference values, so as to determine the test result of whether the buzzer 110 is in good working condition.

If the real values agrees with their respective reference values, in step S314, the reporting module 212 shows the test result denoting that the buzzer is in good working condition. Otherwise if the real values do not agree with their respective reference values, in step S316, the reporting module 212 shows the test result denoting that the buzzer is not in good working condition. The reporting module 130 outputs the test results on a monitor or prints the test results by a printer, or in other suitable manners.

It should be emphasized that the above-described embodiments of the preferred embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A system for testing a buzzer associated with a computer, the system comprising:

a buzzing module for controlling the buzzer to sound continuously according to a reference frequency value and a reference amplitude value;

a recording module for controlling an audio receiving device to record a continuous and steady segment of the buzzer sound, and to store the continuous and steady segment of the buzzer sound as a recorded audio data file;

an analyzing module for analyzing the recorded audio data file to obtain a real frequency value and a real amplitude value of the buzzer sound; and a determining module for comparing the real frequency value and the real amplitude value with respective reference values to determine whether the buzzer is in good working condition.

2. The system according to claim 1, wherein the analyzing module analyzes the recorded audio data file by using a Fast Fourier Transform Algorithm.

3. The system according to claim 1, further comprising a reporting module for reporting a test result according to a comparison result of the determining module, the test result denoting that:

the buzzer is in good working condition if the real values agree with their respective reference values; or the buzzer is not in good working condition if the real values do not agree with their respective reference values.

4. The system according to claim 1, wherein the buzzer, the audio receiving device, and the computer collectively form a transmission loop such that the buzzer sound is received by the audio receiving device and transmitted to the computer.

5. The system according to claim 1, wherein the audio receiving device is a recording pen.

6. The system according to claim 1, wherein the audio receiving device is a microphone.

7. A method for testing a buzzer, the method comprising the steps of:
   controlling the buzzer to sound continuously according to a reference frequency value and a reference amplitude value;
   recording a continuous and steady segment of a buzzer sound;
   storing the continuous and steady segment of the buzzer sound as a recorded audio data file;
   analyzing the recorded audio data file to obtain a real frequency value and a real amplitude value of the buzzer sound; and
   comparing the real frequency value and the real amplitude value with respective reference values to determine whether the buzzer is in good working condition.

8. The method according to claim 7, wherein the recorded audio data file is analyzed by using a Fast Fourier Transform Algorithm.

9. The method according to claim 7, further comprising a step of reporting a test result according to the comparison result, the test result denoting that:
   the buzzer is in good working condition if the real values agree with the respective reference values; or
   the buzzer is not in good working condition if the real values do not agree with the respective reference values.

* * * * *

UNITED STATES PATENT AND TRADEMARK OFFICE
CERTIFICATE OF CORRECTION

PATENT NO. : 7,646,293 B2
APPLICATION NO. : 11/308990
DATED : January 12, 2010
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this

Sixteenth Day of November, 2010

David J. Kappos
*Director of the United States Patent and Trademark Office*